(12) United States Patent
Adams

(10) Patent No.: US 7,097,211 B2
(45) Date of Patent: Aug. 29, 2006

(54) PIPE COUPLING SYSTEM HAVING AN ANTI-REVERSING LOCKING RING

(76) Inventor: Robert M. Adams, 1801 Butternut Ave., Metairie, LA (US) 70001

( * ) Notice: Subject to any disclaimer, the term of this patent is extended or adjusted under 35 U.S.C. 154(b) by 361 days.

(21) Appl. No.: 10/166,348

(22) Filed: Nov. 9, 2001

(65) Prior Publication Data

US 2004/0245778 A1 Dec. 9, 2004

(51) Int. Cl.
F16L 37/08 (2006.01)
(52) U.S. Cl. ...................... 285/321; 285/305
(58) Field of Classification Search ............ 285/305, 285/321, 340, 104, 105, 110; 24/674, 675
See application file for complete search history.

(56) References Cited

U.S. PATENT DOCUMENTS

| | | | |
|---|---|---|---|
| 702,663 A | 6/1902 | Lyle | |
| RE18,144 E * | 8/1931 | Hiermann | 403/155 |
| 2,474,880 A * | 7/1949 | Woodling | 285/334.5 |
| 2,950,132 A * | 8/1960 | Kocsuta | 285/307 |
| 3,389,923 A * | 6/1968 | Love, Jr. et al. | 285/321 |
| 3,532,367 A * | 10/1970 | Erling | 285/302 |
| 4,061,366 A | 12/1977 | Affa | |
| 4,111,464 A * | 9/1978 | Asano et al. | 285/111 |
| 4,146,254 A * | 3/1979 | Turner et al. | 285/105 |
| 4,163,573 A * | 8/1979 | Yano | 285/148.13 |
| 4,288,108 A | 9/1981 | Streit | |
| 4,376,525 A * | 3/1983 | Fremy | 251/149.6 |
| 4,471,978 A * | 9/1984 | Kramer | 285/321 |
| 4,593,944 A * | 6/1986 | Milberger | 285/321 |
| 4,603,886 A * | 8/1986 | Pallini et al. | 285/24 |
| 4,611,837 A * | 9/1986 | Aleck | 285/305 |
| 4,809,532 A * | 3/1989 | Tanaka et al. | 72/337 |
| 4,954,004 A * | 9/1990 | Faber et al. | 403/13 |
| 4,995,643 A | 2/1991 | Rappart et al. | |
| 5,176,413 A * | 1/1993 | Westman | 285/321 |
| 5,226,682 A * | 7/1993 | Marrison et al. | 285/308 |
| 5,662,360 A | 9/1997 | Guzowski | |
| 5,722,702 A * | 3/1998 | Washburn | 285/340 |

(Continued)

FOREIGN PATENT DOCUMENTS

CH 538 626 12/1970

(Continued)

Primary Examiner—James M. Hewitt
(74) Attorney, Agent, or Firm—Adams and Reese LLP

(57) ABSTRACT

A system for coupling a plurality of pipes end-to-end in a locked configuration to thereby form an enclosed conduit comprising a first pipe having a receiving end and an insertion end, a first annular ring track formed on an inner surface of the receiving end; a second pipe, the second pipe having an insertion end and a receiving end, an opposing annular ring track formed on an outer surface of the insertion end; the receiving end of the first pipe sized to tightly receive the insertion end of the second pipe; an anti-reversing locking ring having a partial conic profile, the ring having a leading edge formed on a larger diameter opening of the ring, the ring having a trailing edge formed on a smaller diameter opening of the ring; and the ring positioned in the first ring track of the first pipe with the leading edge of the ring closer to the receiving end than the insertion end, such that when the insertion end of the second pipe is inserted into the receiving end of the first pipe, the trailing end of the ring drops into the opposing ring track of the second pipe to thereby couple the first and the second pipes in the locked configuration.

25 Claims, 11 Drawing Sheets

U.S. PATENT DOCUMENTS

| | | | |
|---|---|---|---|
| 5,725,257 A * | 3/1998 | Sakane et al. | 285/81 |
| 5,813,705 A * | 9/1998 | Dole | 285/321 |
| 6,126,119 A | 10/2000 | Giangrasso | |
| 6,179,347 B1 * | 1/2001 | Dole et al. | 285/321 |
| 6,266,852 B1 | 7/2001 | Tai | |
| 6,308,995 B1 * | 10/2001 | Simson | 285/305 |
| 6,561,720 B1 * | 5/2003 | Wirth et al. | 403/280 |

FOREIGN PATENT DOCUMENTS

| | | | |
|---|---|---|---|
| DE | 3728898 A1 | | 8/1987 |
| EP | 0 032 824 A1 | * | 7/1981 |
| GB | 2075141 A | * | 11/1981 |

* cited by examiner

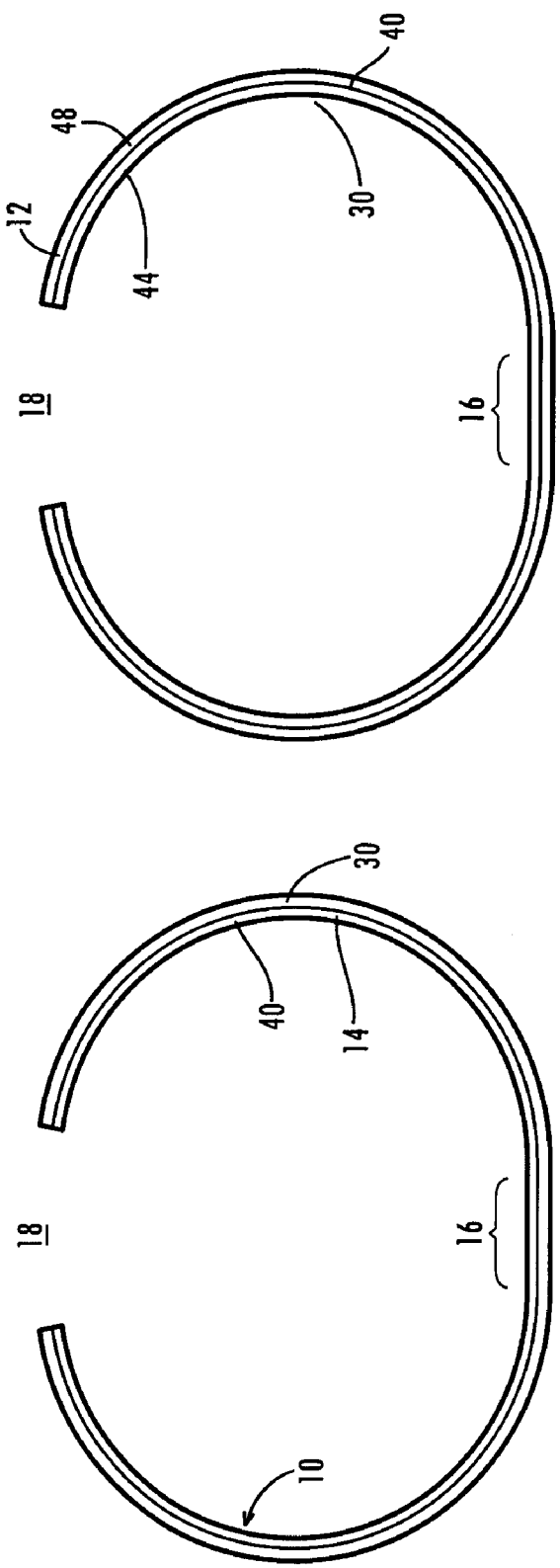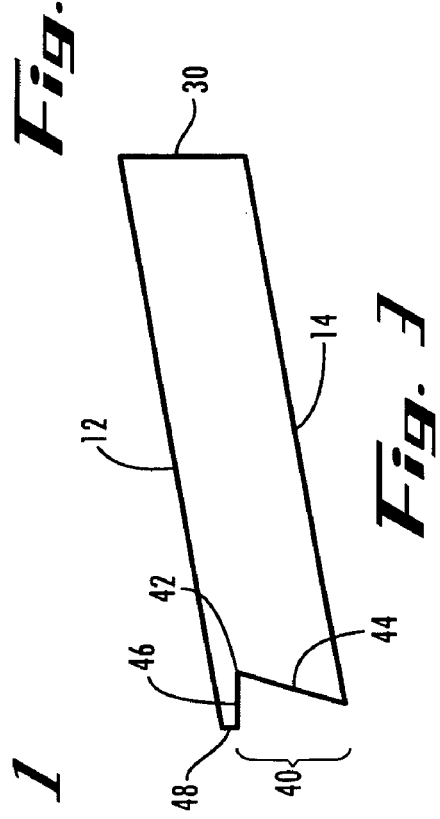

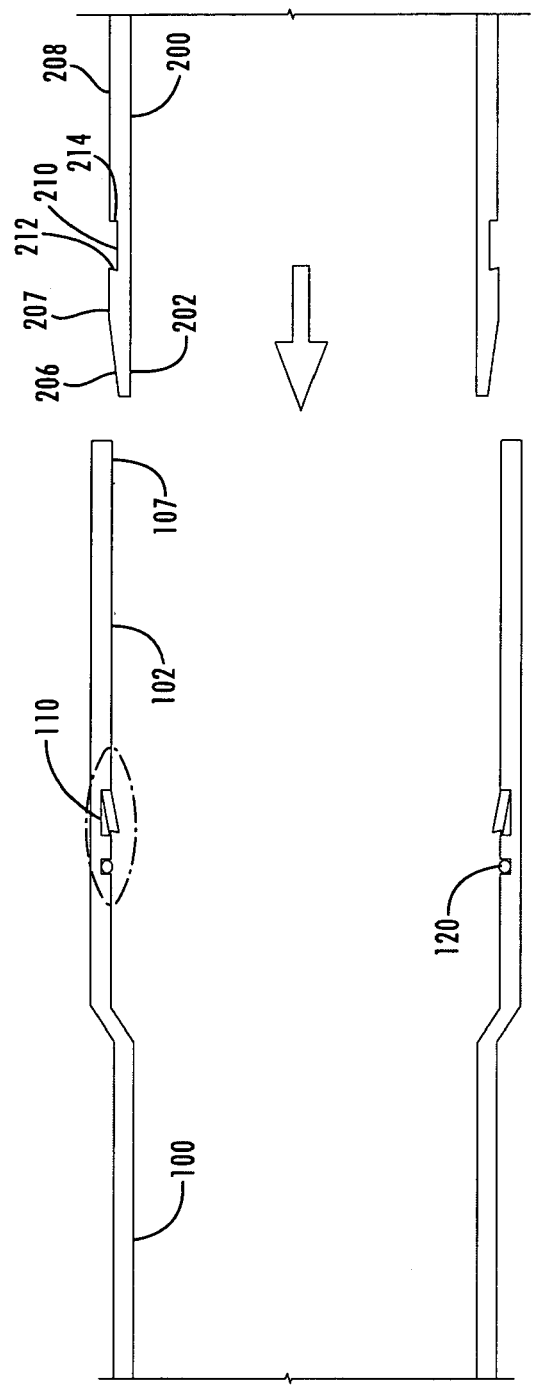
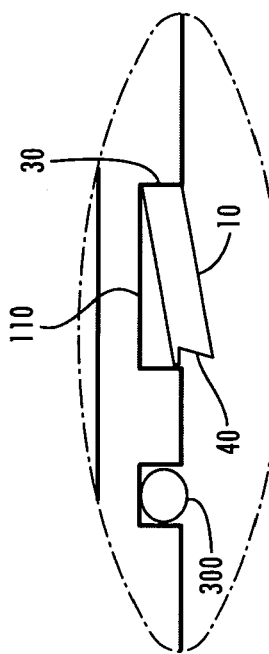
Fig. 4A
Fig. 4B

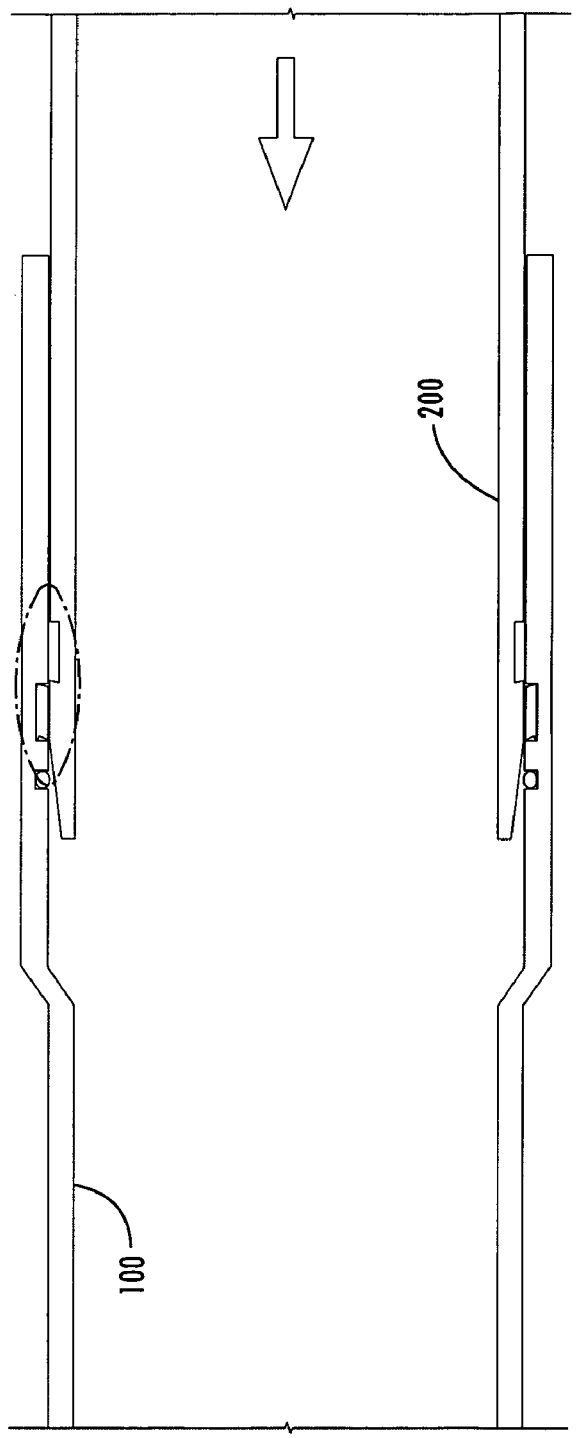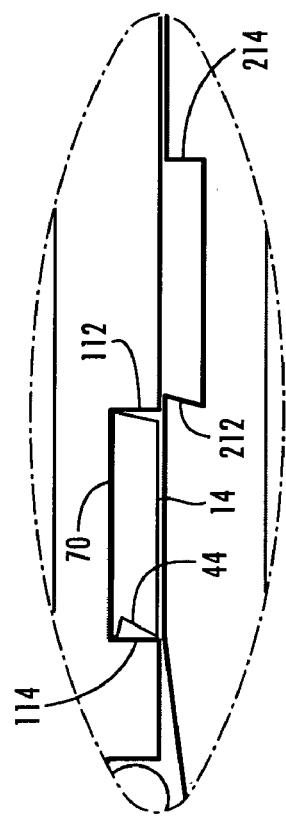

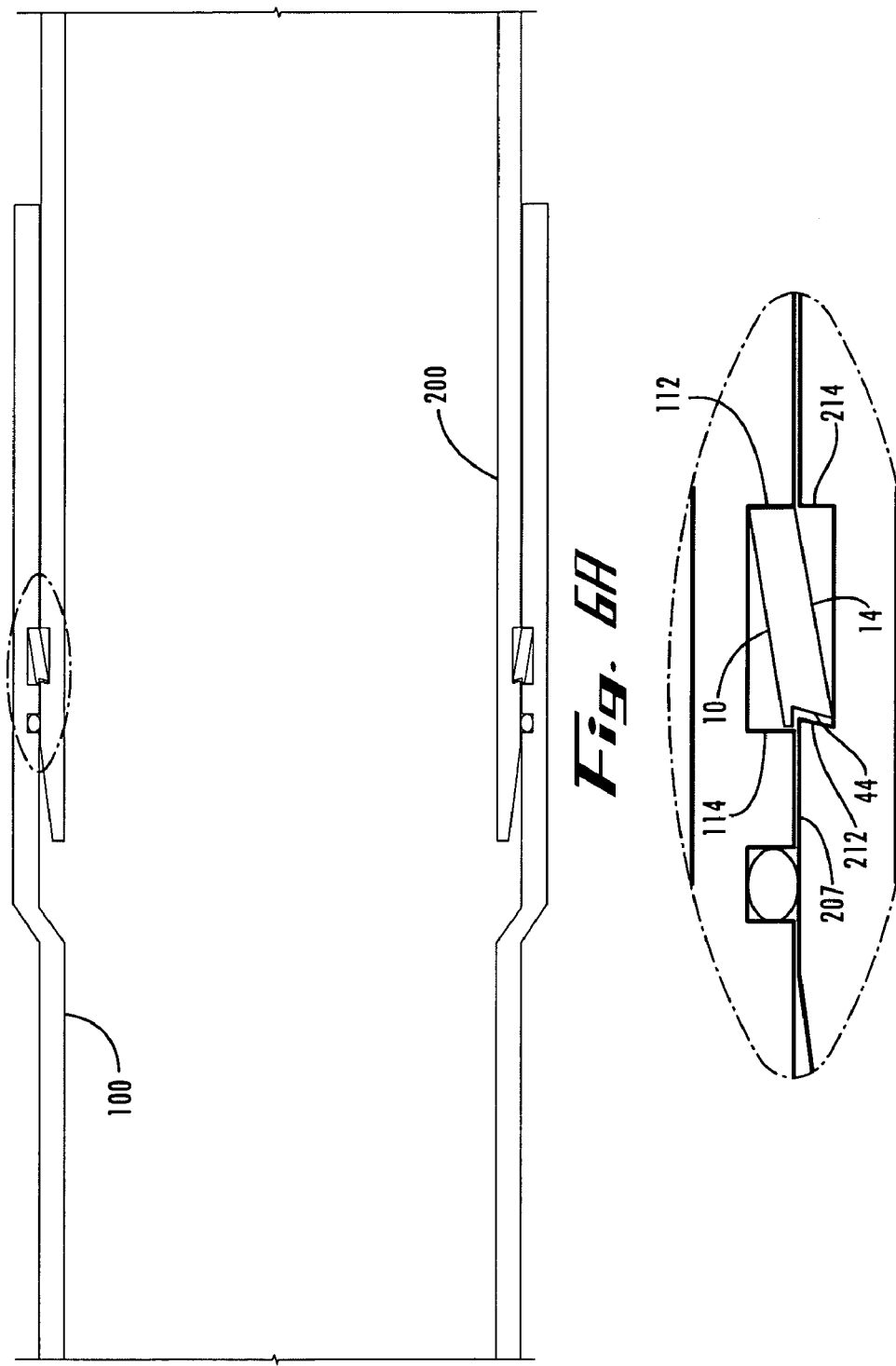

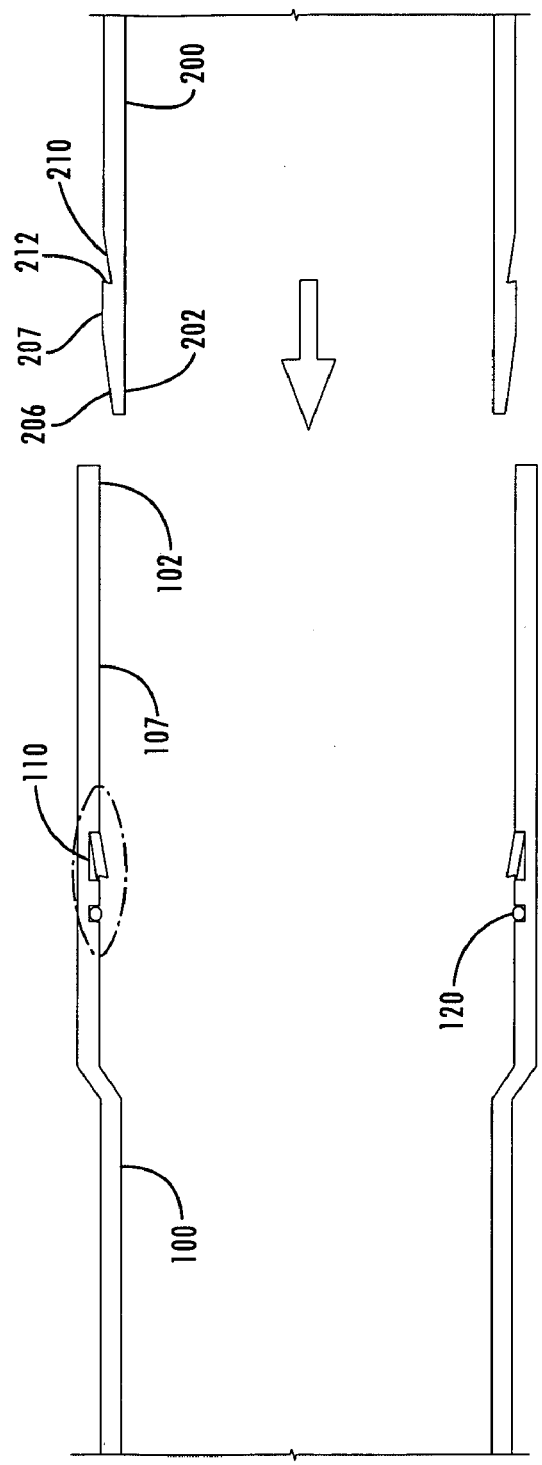
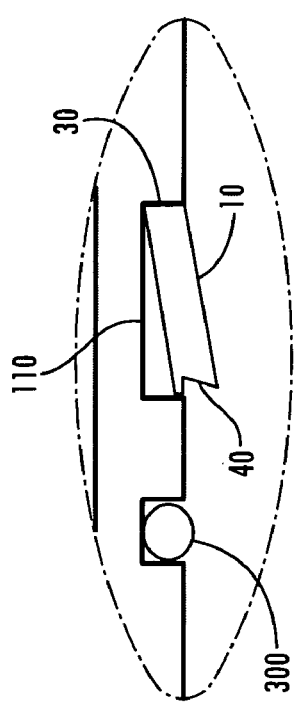
Fig. 7A
Fig. 7B

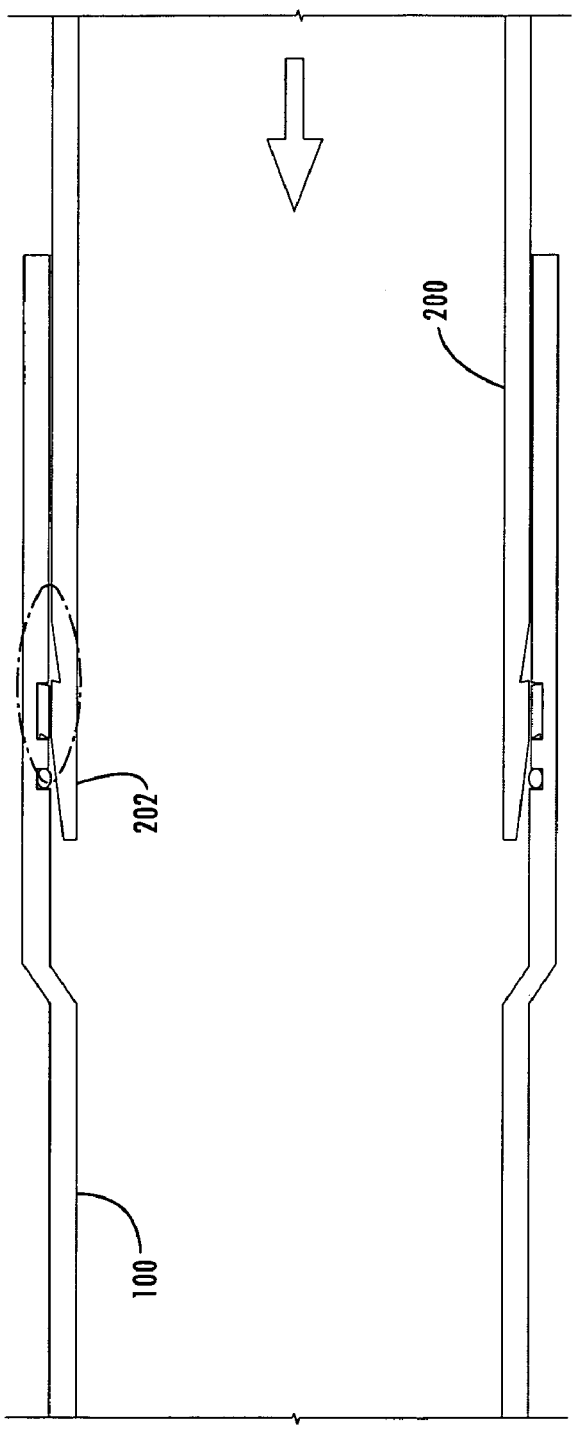
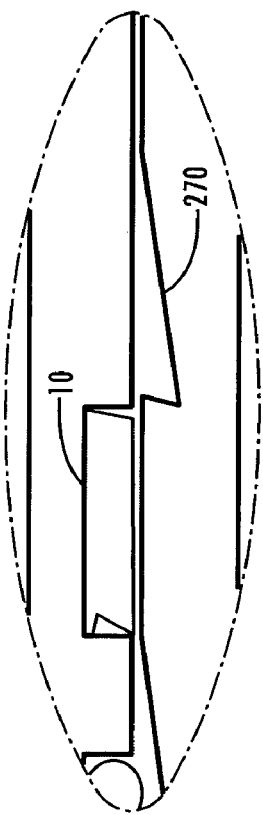
Fig. 8A
Fig. 8B

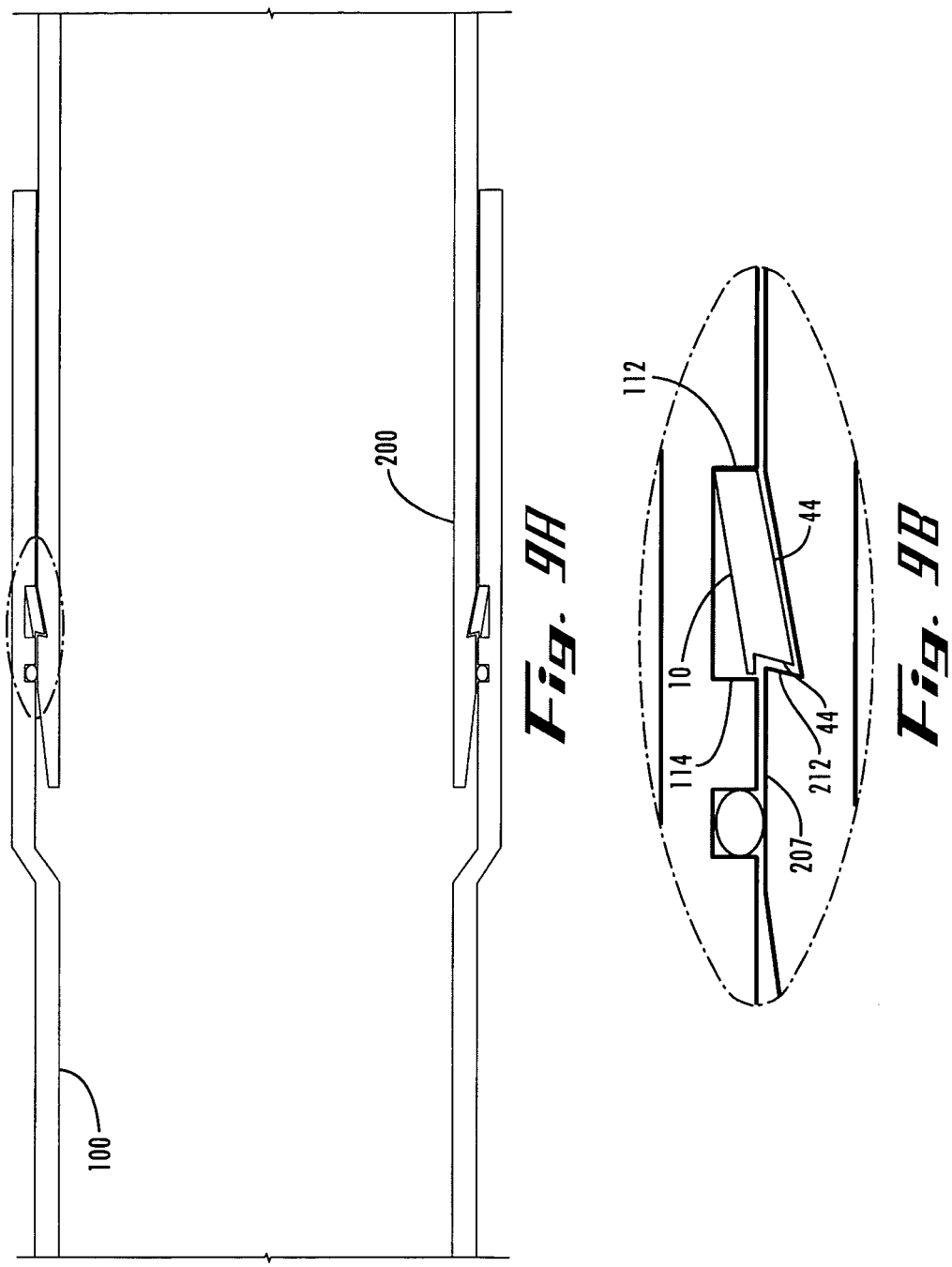

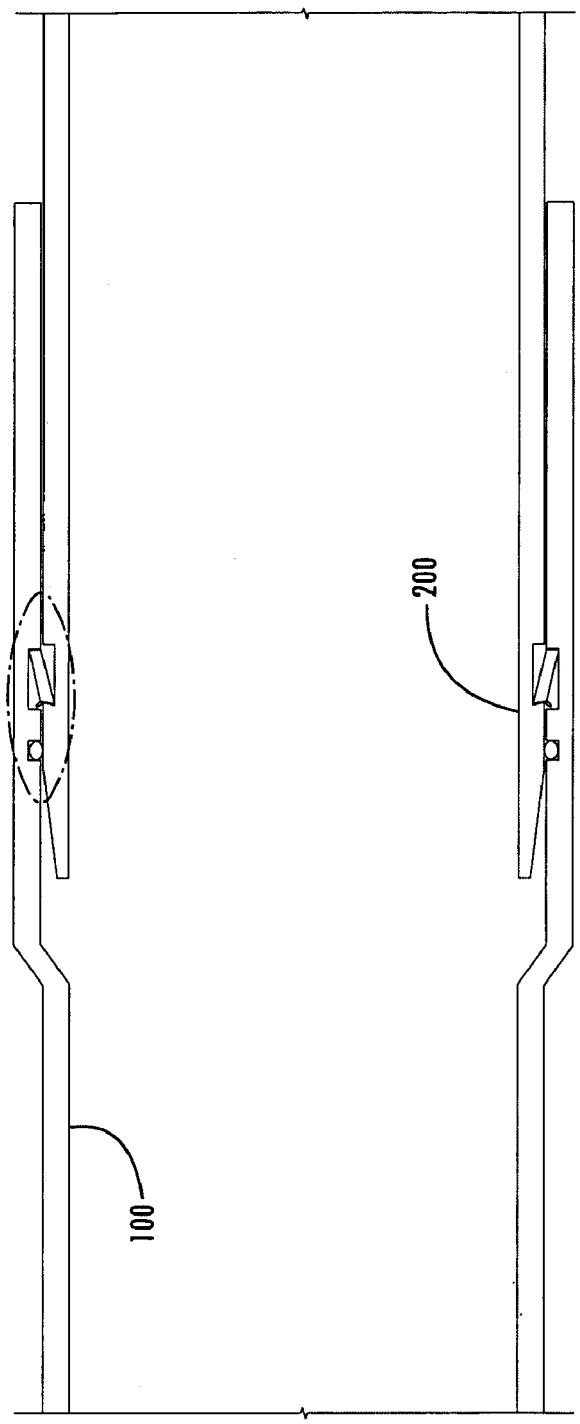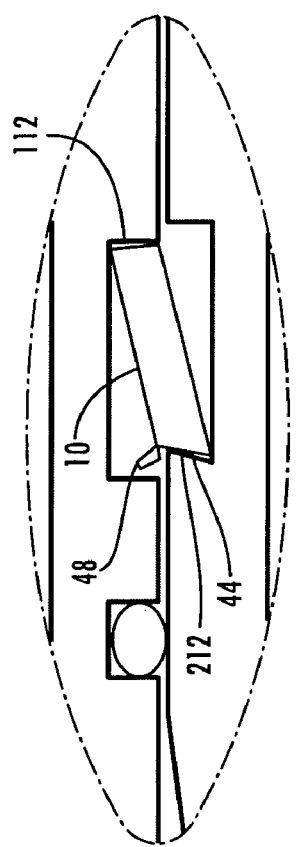

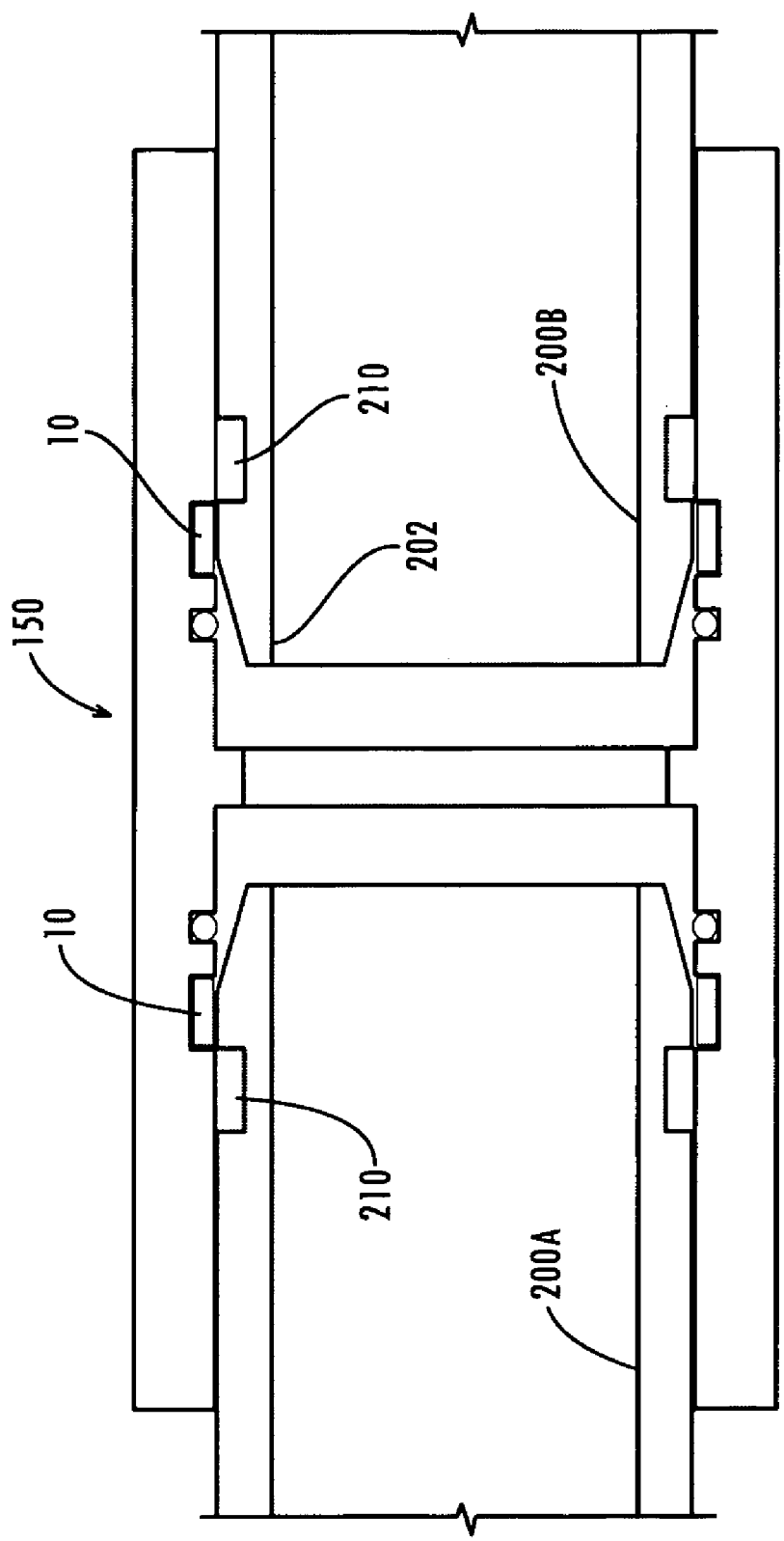

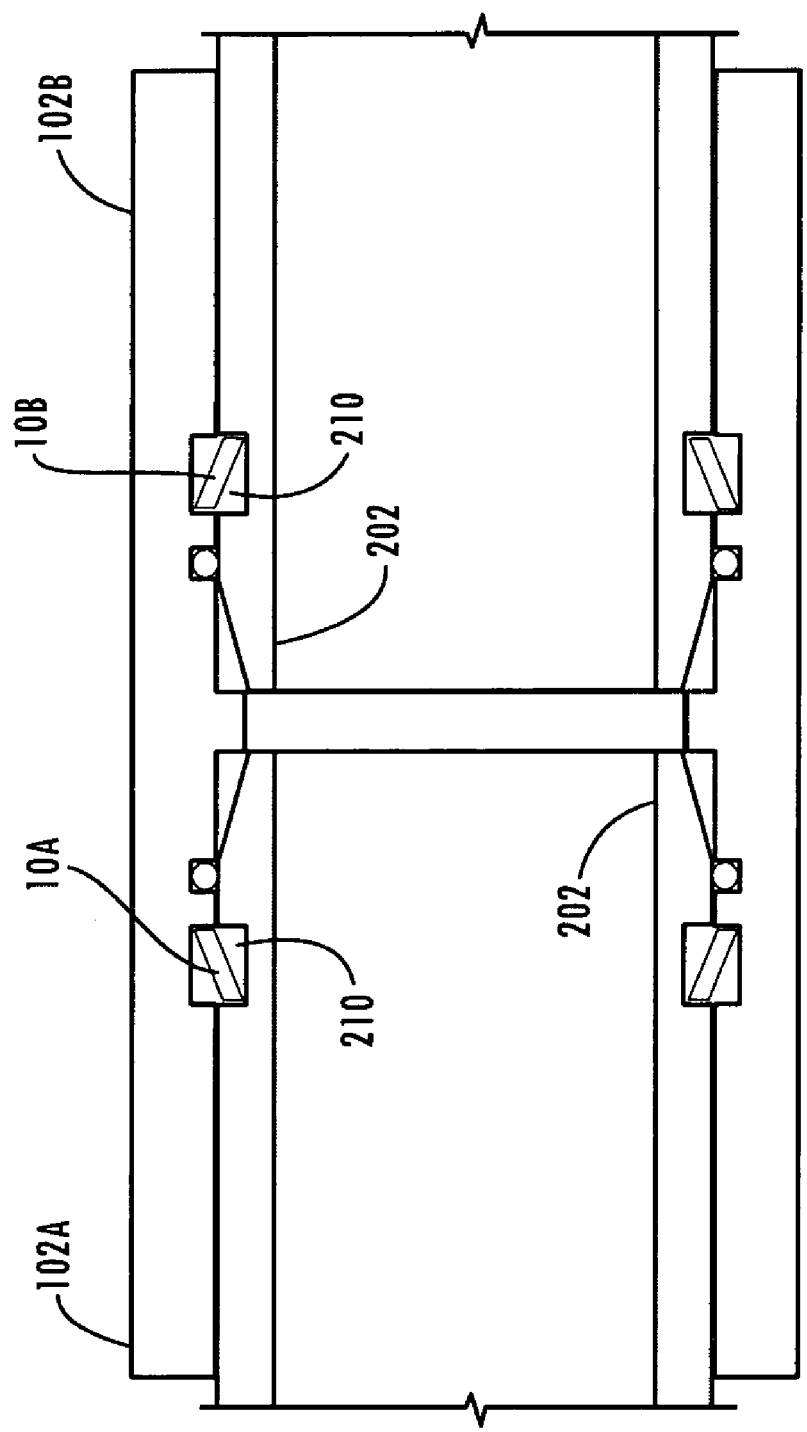

PIPE COUPLING SYSTEM HAVING AN ANTI-REVERSING LOCKING RING

STATEMENT REGARDING FEDERALLY SPONSORED RESEARCH OR DEVELOPMENT

Not Applicable

FIELD OF THE INVENTION

The present invention relates to piping systems that are used to house underground cables and wires in data communication and electrical applications, and more particularly to a quick and easy to use lock-tight pipe coupling system that includes an anti-reversing locking ring.

BACKGROUND OF THE INVENTION

In laying underground cable and electrical wires, a bore hole is drilled and lined with piping to form a conduit. Cables or electrical wires are then run through the pipe. The pipe provides protection against water, dirt, cuts, compression, and the like.

One type of piping system employs HDPE pipe that is stored on and dispensed from a reel. This system suffers from a number of drawbacks, including problems with handling the reel, fusion welding of pipe connections, uncoiling of pipe, wasted pipe, safety hazards and increased labor costs.

One preferred piping system employs a plurality of sections of PVC pipe. The sections of pipe are preferably between 10 to 20 feet in length, so that they are easy to ship and handle. The pipes have inner diameters ranging from about 3 to 6 inches, depending on the application. The sections of PVC pipe are fastened end-to-end so as to prevent water, dirt and the like from entering the pipe. An o-ring or gasket is used to form a water-tight seal between adjacent pipes. Once the pipes are in place, a plurality of cables and/or wires are run through the pipes.

Connecting the pipes end-to-end presents various problems. The pipes can be glued together, but this process is time consuming, and therefore expensive. Additionally, glued joints are not strong enough for boring. Accordingly, attempts have been made to develop alternative coupling systems.

Several companies, including include Carlon/Lamson & Sessions, Certainteed, and Victaulic, distribute a pipe coupling system that employs a nylon locking strap. The strap has a locking means on opposing ends thereof. An annular groove is formed on an inner surface of a receiving end of a first pipe. An aperture extends through the wall of the pipe and communicates with the groove. A matching groove is formed on an outer surface of an insertion end of a second pipe. The insertion end of the second pipe is inserted into the receiving end of the first pipe until the groove and the matching groove are opposite one another. Once the grooves are lined up, the strap is inserted into the aperture and slid into the opposing grooves. The strap is sized to occupy both the groove and the matching groove, such that the strap and the grooves together prevent the first and second pipes from sliding relative to one another. While the strap mechanism is effective for locking pipes end-to-end, it can be difficult to align the opposing grooves and to insert the strap into the opposing grooves. The separate straps also require installation by the end user, which increases installation cost. Additionally, straps may become dislodged during pipe installation, resulting in uncoupling of pipes.

There is thus a need for a pipe coupling system having the following characteristics and advantages over the prior art.

OBJECTS AND SUMMARY OF THE INVENTION

It is an object of the invention to provide a pipe coupling system which employs an anti-reversing locking ring.

It is another object of the invention to provide a pipe coupling system that provides a lock-tight fit.

It is another object of the invention to provide a pipe coupling system that maintains pipes in a locked configuration when subjected to the stresses and strains encountered in underground cable installations.

It is another object of the invention to provide a pipe coupling system that has no loose parts for end users to keep track of and separately install.

It is another object of the invention to provide a pipe coupling system in which the pipes only require being pushed together until an internal locking ring engages opposing grooves, such that there is no need to line up opposing grooves before manually installing an externally shipped ring.

It is another object of the invention to provide a pipe coupling system that can be used with conventional PVC and other types of plastic conduit systems for cables, electrical wires, and the like, and which can also be used for conducting fluids and gases.

It is yet another object of the invention to provide a pipe coupling system that is easy and economical to use.

It is still another object of the invention to provide a pipe coupling system that has a long useful life.

These and other objects and advantages of the invention shall become apparent from the following general and preferred description of the invention.

Accordingly, a system for coupling piping is provided as described below and in the accompanying claims.

BRIEF DESCRIPTION OF THE DRAWINGS

FIG. 1 is a front view of one preferred embodiment of an anti-reversing locking ring of the invention, featuring a view of a leading edge of the ring.

FIG. 2 is a rear view of one preferred embodiment of an anti-reversing locking ring of the invention, featuring a view of a trailing edge of the ring.

FIG. 3 is a side cross-section view taken through A—A of FIG. 1.

FIG. 4A is a side cross-section view of one preferred embodiment of insertion and receiving ends of piping in an uncoupled configuration.

FIG. 4B is a close-up view of details of the ring and ring track of FIG. 4A.

FIG. 5A is a side cross-section view of the embodiment of FIG. 4 showing interaction of the trailing edge of the ring with the inwardly slanted wall of the ring track when under compression.

FIG. 5B is a close-up view of details of the ring and ring track of FIG. 5A when under compression.

FIG. 6A is a side cross-section view of the embodiment of FIGS. 4 and 5 showing the piping in a coupled configuration.

FIG. 6B is a close-up view of details of the ring and ring track of FIG. 6A in a coupled configuration.

FIGS. 7, 8 and 9 present side cross-section views of one alternate embodiment of the invention utilizing a V-shaped groove in the insertion end of the pipe.

FIG. 10A is a side cross-section of one preferred embodiment of insertion and receiving ends of piping in a coupled configuration indicating effects of tensile pressure applied to the ring.

FIG. 10B is a close-up view of details of the ring and ring track of FIG. 10A.

FIG. 12 is a side cross-section view of the coupling of FIG. 11 showing interaction of the rings with the inwardly slanted wall of the ring tracks of the coupling when under compression.

FIG. 13 is a side cross-section view of the coupling of FIGS. 11 and 12 showing insertion ends of the coupling and receiving ends of the piping in a coupled configuration.

PREFERRED EMBODIMENTS OF THE INVENTION

Figure 11:
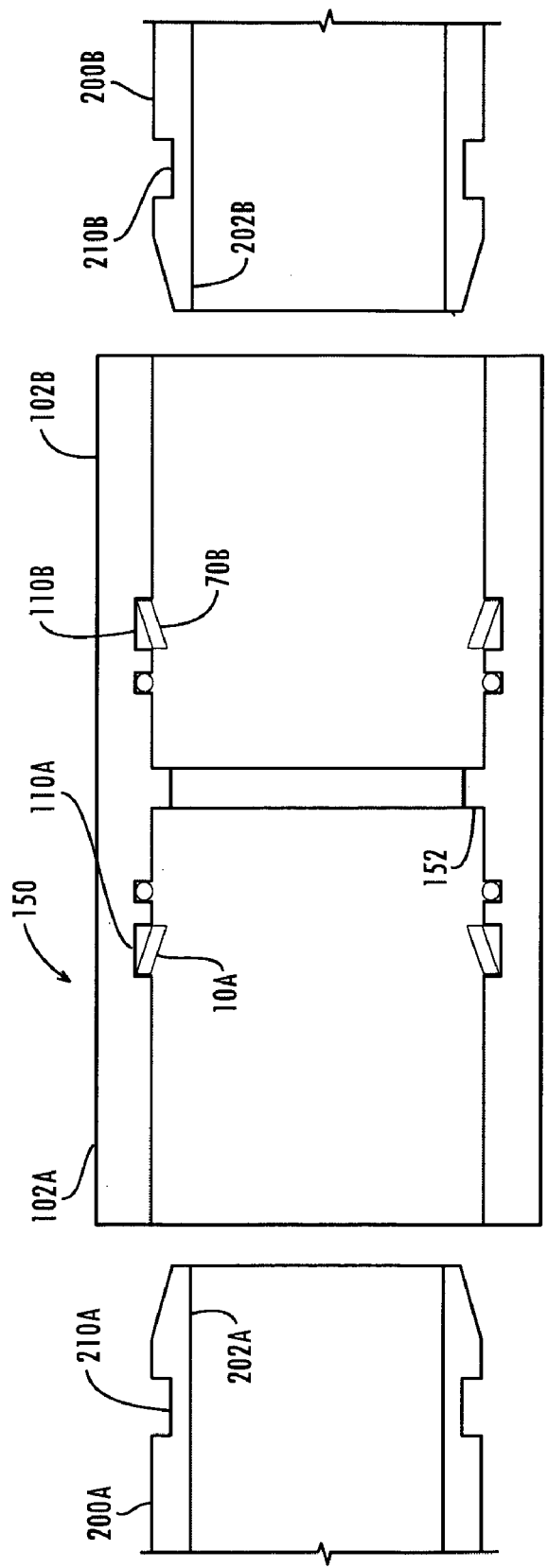
FIG. 11 is a side cross-section view of one preferred embodiment of a coupling having opposing receiving ends, and featuring the coupling and insertion ends of piping in an uncoupled configuration.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

As shown in FIG. 1, a primary component of the present invention is an anti-reversing locking ring 10. As shown in FIG. 4, the ring 10 is included as a component of a receiving end 102 of a first pipe 100. The pipe 100 and ring 10 are preferably made of PVC or other types of plastic. The pipe 100 and ring 10 can be made of steel, aluminum, or other metals. The pipe 100 is preferably of relatively short length (10 to 20 feet) so as to facilitate shipping, handling, and installation. The pipe preferably has an inner diameter of 2 to 12 inches. As shown in FIG. 4, an insertion end 202 of a second pipe 200 is inserted into the receiving end 102 of the first pipe 100. As will be described in further detail below, the ring 10 keeps the first 100 and second 200 pipes from separating from one another.

As shown most clearly in the section views of FIGS. 3, 4, and 5, the ring 10 has a partial conic profile when viewed from the side. FIG. 1 shows a view of the ring 10 from the leading edge 30 side of the ring 10. As shown in FIG. 1, the inner sidewall 14 of the ring 10 tapers inward toward the trailing edge 40 of the ring 10 (or outward toward the leading edge 30), such that the opening of the trailing edge 40 is slightly smaller than the opening of the leading edge 30 of the ring 10. FIG. 2 shows a view of the ring 10 from the trailing edge 40 of the ring 10 (i.e. 180 degrees from FIG. 1). As shown in FIG. 2, the outer sidewall 12 of the ring 10 also tapers inward toward the trailing edge 40 (or outward toward the leading edge 30). The sidewall of the ring 10 preferably has a slope of between about 8 to 15 degrees.

As shown most clearly in FIG. 3, the leading edge 30 of the ring 10 preferably has a flattened profile. As also shown in FIG. 3, the trailing edge 40 of the ring 10 preferably has an annular groove 42 formed therein. The groove 42 is configured to prevent the trailing edge 40 of the ring 10 from slipping out of an annular ring track 210 in the second pipe 200, in a manner described below. In the preferred embodiment shown in FIG. 3, the groove 42 is formed by an inclined flat base 44 and an inclined flat wall 46, such that the base 44 and wall 46 together form a groove 42 having a less than 90 degree angle, and preferably of about 75 degrees. The base is preferably inclined at about 15 degrees relative to the trailing edge rim (or between about 60 to 70 degrees relative to the inner sidewall 14 of the ring 10). A catch member 48 is formed contiguously with the outer sidewall 12.

As shown in FIGS. 1 and 2, the ring 10 preferably has a gap or opening 18. The gap 18 facilitates insertion of the ring 10 into the receiving end 102 of the first pipe 100 and into the ring track 110, and also allows for expansion of the ring 10 during coupling of pipes. The ring 10 also preferably has a flattened portion 16 positioned substantially opposite the gap 18. The flattened portion 16 helps keep the gap 18 spread apart, which biases the ring 10 against the annular ring track 110 and thereby maintains the ring 10 within the ring track 110. The flattened portion 16 may be eliminated, in which case the ring 10 is preferably sized to have a pre-installed round diameter that is larger than its compressed (installed) diameter so as to create a spring effect needed to keep the ring 10 in place until the two pipes 100, 200 are connected. Additionally, the opening 18 can be a V-shaped partial opening (i.e. not extending all the way through the ring 10), such that the V-shaped opening allows sufficient play in the ring 10 to facilitate insertion of the ring 10 into the first annular groove 110 of the insertion end 102 of the pipe 100.

As shown in FIG. 4, the receiving end 102 of the first pipe 100 has an inner diameter slightly greater than the outer diameter of the insertion end 202 of the second pipe 200. This configuration can be achieved by providing the receiving end 102 of the first pipe 100 with a conventional belled end, as shown in FIGS. 4 and 5. A first annular ring track 110 is formed on an inner surface 107 of the receiving end 102 of the first pipe 100. An opposing annular ring track 210 is formed on an outer surface 208 of the second pipe 200. As shown in FIG. 4, the insertion end 202 of the second pipe 200 is preferably provided with a tapered outer rim 206 to facilitate insertion of the second pipe 200 into the first pipe 100 and to compress ring 10 into groove 110 upon insertion of end 202 within belled end 102. The wall of the ring 10 is preferably about the same thickness as the depth of the first ring track 110 and is preferably slightly thicker than the depth of the opposing ring track 210.

As shown in FIG. 4, the ring 10 is fitted into the first annular ring track 110 of the first pipe 100. When the insertion end 202 of the second pipe 200 is inserted into the receiving end 102 of the first pipe 100, the outer surface 208 of the second pipe 200 initially compresses the ring 10 into the first ring track 110 of the first pipe 100. When the ring track 110 of the first pipe 100 and the opposing ring track 210 of the second pipe 200 intersect, the trailing edge 40 of the ring 10 snaps into the opposing ring track 210 of the second pipe 200. As shown in FIG. 5, once the ring 10 snaps into the opposing ring track 210, the ring 10 occupies at least a portion of both the first and the opposing ring tracks 110, 210. As shown in FIG. 5, due to the partial conical configuration of the ring 10, the leading edge 30 of the ring 10 preferably substantially occupies the first ring track 110 of the first pipe 100, while the trailing edge 40 of the ring 10 preferably substantially occupies the opposing ring track 210 of the second pipe 200. When in this configuration, the ring 10 prevents the first and second pipes 100, 200 from sliding relative to one another, except within a selected range of play. In this manner, the first and second pipes 100, 200 are locked relative to one another, and will remain so unless sufficient tensile stress is applied to the pipes 100, 200 to cause the ring 10, pipe 100 or pipe 200 to fail.

When the first and second pipes 100, 200 are subjected to a tensile stress while locked together, the leading edge 212 of the ring track 210 of the second pipe 200 compresses the trailing edge 40 of the ring 10, while the leading edge 112 of the ring track 110 of the first pipe 100 compresses the leading edge 30 of the ring 10. With the pipes 100, 200 sandwiched on either side of the ring 10 in this manner, the ring 10 prevents the pipes 100, 200 from being pulled apart.

The tensile strength of the assembled invention is directly related to the tensile strength of the weakest of the three major components, namely the two pipes 100, 200 and the locking ring 10 fastening the two pipes 100, 200 together. The strength of each of the pipes 100, 200 being joined is directly related to the depth of the grooves or ring tracks 110, 210 in each pipe for receiving the locking ring 10. Material removed from each of the pipes 100, 200 for the placement of the groove 110, 210 creates a weaker area than that of the areas where the thicker portions (i.e. full pipe wall thickness) remain. The tensile strength of the locking ring 10 is directly related to the amount of the ring 10 that can be placed between the grooves 110, 210 of the two pipes 100, 200 being joined. Increasing the amount of the ring 10 exposed to the tensile forces increases the quantity of material that is required to be sheared away before the ring 10 fails. The strongest connection is a balance between getting the greatest amount of the locking ring 10 engaged with the shallowest of grooves 110, 210 in the pipes 100, 200.

FIGS. 7, 8 and 9 show a side cross-section views of an alternative preferred embodiment of the invention in which the insertion end 202 of the pipe 200 has a V-shaped opposing annular ring track 210 having a triangular side view profile. The V-shaped ring track 210 preferably has an inwardly slanted leading edge, in the manner described above. One advantage of the V-shaped embodiment of FIGS. 7–9 is that the wall of the pipe 200 will tend to be stronger in the region of the ring track, since less material is eliminated from the ring track 210.

As shown in FIGS. 10A and 10B, when the first and second pipes 100, 200 are subjected to a tensile stress while locked together, the angular leading edge 212 of the opposing annular ring track or groove 210 engages with the angular trailing edge 44 of the ring 10, while the leading edge 112 of first annular ring track 110 engages with leading edge 30 of ring 10. Upon increased tensile stress, the angular edge or inclined base 44 of the ring 10 is drawn inwardly deeper into the opposing annular ring track 210 by means of sliding against the angular leading edge 212 of track 210. The resultant pressure between the outer surface 207 of pipe 200 and wall 46 of ring 10 causes catch member 48 of ring 10 to fold outwardly, as shown most clearly in FIG. 10B. The displacement of catch member 48 allows the angular edge 44 of ring 10 to be drawn increasingly deeper into the angular edge 212 of groove 210, thus providing a greater contact surface between the edge 44 of the ring 10 and the edge 212 of groove 210. The greater contact surface exposes a greater material cross-section of ring 10 to the tensile stresses resulting in increased shear strength of the ring 10.

Over insertion of the two pipes when under compressive force will be retarded to some degree by contact between the face 14 of the ring 10 and the trailing edge 214 of the pipe 200. If over insertion occurs, it will be halted once the insertion end 202 of the second pipe 200 bottoms out at the base of the receiving bell in the first pipe 100, in the conventional manner.

As shown in FIG. 4, an annular gasket groove 120 is also formed on the inner surface 107 of the receiving end 102 of the first pipe 100. An o-ring 300 is positioned in the annular gasket groove 120, such that when the insertion end 202 of the second pipe 200 is inserted in the insertion end 102 of the first pipe 100, the o-ring 300 forms a substantially water tight seal against the outer surface 208 of the second pipe. Additionally, each pipe 100, 200 is provided with both a receiving end 102 and an insertion end 202, each end being configured with the foregoing components of the invention, such that the pipes can be coupled end-to-end to form a conduit of a desired length.

FIGS. 11–13 show a side cross-section view of one preferred embodiment of a coupling 150 according to the invention having opposing receiving ends 102A, 102B. As shown particularly in FIG. 13, the coupling 150 is used to join the insertion ends 202A, 202B of a pair of pipes 200A, 200B end-to-end. As can be appreciated from FIGS. 11–13, the coupling 150 includes a pair of annular ring tracks 100A, 110B and inserted locking rings 10A, 10B configured in the manner described above. A stop member 152, which is preferably annular, is interposed between the opposing receiving ends 102A, 102B in order to prevent over insertion of insertion ends 202A, 202B of the pipes 200A, 200B, as shown particularly in FIG. 13. In FIG. 11, the coupling 150 and the insertion ends 202A, 202B of piping 200A, 200B, are shown in an uncoupled configuration. FIG. 12 shows interaction of the rings 10A, 10B with the inwardly slanted wall of the ring tracks 110A, 110B of the coupling 150 when under compression during insertion of the pipes 200A, 200B into the coupling 150. FIG. 13 shows the insertion ends 102A, 102B of the coupling and the receiving ends of the piping 200A, 200B in a coupled configuration. The coupling 150 can be used to couple pipes 200 that have two opposing insertion ends 202 (i.e. rather than one receiving end 102 and one insertion end 202). The coupling 150 can also be used to couple piping conduits that have been constructed from opposite directions, such that the conduits join together at a pair of insertion ends 202A, 202B.

In operation, the pipe coupling system of the invention is used to provide a conventional conduit or raceway for cables, electrical wires, and the like, the only difference being the manner in which the sections of pipe are coupled together. Using conventional boring technologies, including directional drilling techniques, a bore hole is formed and lined with a plurality of the pipes 100, 200. The pipes are coupled end-to-end by simply inserting the insertion end 202 of one pipe into a receiving end 102 of an adjacent pipe until the ring 10 expands into the opposing slot 210, in the manner described above. In this manner, a plurality of pipes are securely coupled together, and the o-rings 300 provide a water-tight seal at each pipe coupling. Once the conduit has been constructed, cables or electrical wires are run through the conduit in the conventional manner. The conduit can also be used for conducting fluids and gases.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A system for coupling a plurality of pipes end-to-end in a locked configuration to thereby form an enclosed conduit comprising: a plurality of pipes, each said pipe having a receiving end and an insertion end, a first annular ring track formed on an inner surface of said receiving end, an opposing annular ring track formed on an outer surface of said insertion end, said receiving end of each said pipe sized to tightly receive an insertion end of another of said pipes, each said pipe having an anti-reversing locking ring in said receiving end ring track, said ring having a gap therethrough and a flattened portion positioned substantially opposite said gap, said flattened portion biasing said ring against said first ring track to thereby assist in maintaining said ring in said first ring track, said ring having a partial conic profile, a leading edge formed on a larger diameter opening of said ring, said leading edge having a flattened profile, a trailing edge formed on a smaller diameter opening of said ring, said trailing edge having a substantially annular groove formed therein, said ring positioned in said receiving end ring track with said leading edge of said ring closer to said receiving end than said insertion end, such that when said insertion end of one said pipe is inserted into said receiving end of another of said pipes, said trailing end of said ring drops into said opposing ring track of said insertion end to thereby couple said pipes in the locked configuration.

2. The system of claim 1, wherein said trailing edge groove is formed by an inclined base and an inclined wall, a catch member being formed contiguously with said wall.

3. The system of claim 2, further comprising a leading edge of said opposing ring track having an inwardly slanted side wall, said inwardly slanted side wall configured to abut against said base of said groove of said ring when said coupled pipes are subjected to a tensile stress while in the locked configuration to thereby compel said ring inwardly deeper into said opposing annular ring track.

4. The system of claim 1, wherein said gap is V-shaped.

5. The system of claim 1, further comprising said insertion end of said pipes having a tapered outer rim to thereby facilitate insertion of said insertion end into a receiving end of another of said pipes.

6. The system of claim 1, further comprising an annular gasket groove formed on said inner surface of said receiving end of said pipes and an o-ring positioned in said annular gasket groove.

7. The system of claim 1, wherein a sidewall of said ring has a slope of between about 8 to 15 degrees.

8. A system for coupling a plurality of pipes end-to-end in a locked configuration to thereby form an enclosed conduit comprising: a first pipe, said first pipe having a receiving end and an insertion end, a first annular ring track formed on an inner surface of said receiving end, a second pipe, said second pipe having an insertion end and a receiving end, an opposing annular ring track formed on an outer surface of said insertion end, said receiving end of said first pipe sized to tightly receive said insertion end of said second pipe, an anti-reversing locking ring having a partial conic profile, said ring having a leading edge formed on a larger diameter opening of said ring, said ring having a trailing edge formed on a smaller diameter opening of said ring, said leading edge of said ring has a flattened profile and said trailing edge of said ring has a substantially annular groove, said groove configured to prevent said trailing edge of said ring from slipping out of said opposing ring track of said second pipe when said first and said second pipe are coupled in the locked configuration, and said ring positioned in said first ring track of said first pipe with said leading edge of said ring closer to said receiving end than said insertion end, such that when said insertion end of said second pipe is inserted into said receiving end of said first pipe, said trailing edge of said ring drops into said opposing ring track of said second pipe to thereby couple said first and said second pipes in the locked configuration; and wherein said ring includes a gap therethrough, said ring further having a flattened portion positioned substantially opposite said gap said flattened portion biasing said ring against said first ring track to thereby assist in maintaining said ring in said first ring track.

9. The system of claim 1, wherein said trailing edge groove is formed by an inclined base and an inclined wall, a catch member being formed contiguously with said wall.

10. The system of claim 9, further comprising a leading edge of said opposing ring track of said second pipe having an inwardly slanted side wall, said inwardly slanted side wall configured to abut against said base of said groove of said ring when said first and said second pipe are subjected to a tensile stress while in the locked configuration to thereby compel said ring inwardly deeper into said opposing annular ring track.

11. The system of claim 1, wherein said gap is V-shaped.

12. The system of claim 1, further comprising said insertion end of said second pipe having a tapered outer rim to thereby facilitate insertion of said second pipe into said first pipe.

13. The system of claim 1, further comprising an annular gasket groove formed on said inner surface of said receiving end of said first pipe and an o-ring positioned in said annular gasket groove, such that said o-ring forms a substantially water-tight seal against said outer surface of said second pipe when said first and second pipe are coupled together in the locked configuration.

14. The system of claim 1, wherein a sidewall of said ring has a slope of between about 8 to 15 degrees.

15. A system for coupling pipes end-to-end to thereby form an enclosed conduit comprising: a first pipe, said first pipe having a receiving end and an insertion end, a first annular ring track formed on an inner surface of said receiving end, a second pipe, said second pipe having an insertion end and a receiving end, an opposing annular ring track formed on an outer surface of said insertion end, said insertion end of said second pipe inserted in said receiving end of said first pipe such that said first and said opposing ring tracks are aligned with one another, an anti-reversing locking ring having a partial conic profile, said ring having a leading edge formed on a larger diameter opening of said ring, said ring having a trailing edge formed on a smaller diameter opening of said ring, said leading edge of said ring has a flattened profile and a trailing edge of said ring has a substantially annular groove, said groove configured to prevent said trailing edge of said ring from slipping out of said opposing ring track of said second pipe when said first and said second pipe are coupled in a locked configuration, and said leading edge of said ring disposed in said first ring track and said trailing edge of said ring disposed in said opposing ring track, such that said ring and said ring tracks together maintain said pipes in said locked configuration; and wherein said ring includes a gap therethrough, said ring further having a flattened portion positioned substantially opposite said gap, said flattened portion biasing said ring against said first ring track to thereby assist in maintaining said ring in said first ring track.

16. The system of claim 15, wherein said trailing edge groove is formed by an inclined base and an inclined wall, a catch member being formed contiguously with said wall.

17. The system of claim 16, further comprising a leading edge of said opposing ring track of said second pipe having an inwardly slanted side wall, said inwardly slanted side wall configured to abut against said base of said groove of said ring when said first and said second pipe are subjected to a tensile stress while in the locked configuration to thereby compel said ring inwardly deeper into said opposing annular ring track.

18. The system of claim 15, wherein said gap is V-shaped.

19. The system of claim 15, further comprising said insertion end of said second pipe having a tapered outer rim to thereby facilitate insertion of said second pipe into said first pipe.

20. The system of claim 15, further comprising an annular gasket groove formed on said inner surface of said receiving end of said first pipe and an o-ring positioned in said annular gasket groove, such that said o-ring forms a substantially water-tight seal against said outer surface of said second pipe when said first and second pipe are coupled together in said locked configuration.

21. The system of claim 15, wherein a sidewall of said ring has a slope of between about 8 to 15 degrees.

22. A system for coupling a plurality of pipes end-to-end in a locked configuration to thereby form an enclosed conduit comprising: a plurality of pipes, each said pipe having a receiving end and an insertion end, a first annular ring track formed on an inner surface of said receiving end, an opposing annular ring track formed on an outer surface of said insertion end, said receiving end of each said pipe sized to tightly receive an insertion end of another of said pipes, each said pipe having an anti-reversing locking ring in said receiving end ring track, said ring having a gap therethrough and a flattened portion positioned substantially opposite said gap, said flattened portion biasing said ring against said first ring track to thereby assist in maintaining said ring in said first ring track, said ring having a partial conic profile, a leading edge formed on a larger diameter opening of said ring, said leading edge having a flattened profile, a trailing edge formed on a smaller diameter opening of said ring, said ring positioned in said receiving end ring track with said leading edge of said ring closer to said receiving end than said insertion end, such that when said insertion end of one said pipe is inserted into said receiving end of another of said pipes, said trailing edge of said ring drops into said opposing ring track of said another pipe to thereby couple said coupled pipes in the locked configuration, and said trailing edge of said ring having a means thereon for retaining said trailing edge in said opposing track when said pipes are subjected to a tensile stress.

23. A method of coupling a plurality of pipes end-to-end in a locked configuration to thereby form an enclosed conduit comprising: providing a plurality of pipes, each said pipe having a receiving end and an insertion end, a first annular ring track formed on an inner surface of said receiving end, an opposing annular ring track formed on an outer surface of said insertion end, said receiving end of each said pipe sized to tightly receive an insertion end of another of said pipes, each said pipe having an anti-reversing locking ring in said receiving end ring track, said ring having a gap therethrough and a flattened portion positioned substantially opposite said gap, said flattened portion biasing said ring against said first ring track to thereby assist in maintaining said ring in said first ring track, said ring having a partial conic profile, a leading edge formed on a larger diameter opening of said ring, said leading edge having a flattened profile, a trailing edge formed on a smaller diameter opening of said ring, said trailing edge having a substantially annular groove formed therein, said ring positioned in said receiving end ring track with said leading edge of said ring closer to said receiving end than said insertion end, inserting an insertion end of one of said pipes into a receiving end of another of said pipes until said trailing edge of said ring enters said opposing ring track of said another pipe, to thereby couple said pipes in the locked configuration.

24. The method of claim 23, further comprising repeating said step of inserting an insertion end of one of said pipes into a receiving end of another of said pipes until said trailing edge of said ring enters said opposing ring track of said other pipe, to thereby couple a plurality of said pipes end-to-end in the locked configuration.

25. The method of claim 24, further comprising running a cable or electrical wire through said conduit.

* * * * *